United States Patent [19]

Prickett

[11] 4,217,581

[45] Aug. 12, 1980

[54] HIGH RANGE RESOLUTION RADAR RATE AIDED RANGE TRACKER

[75] Inventor: Michael J. Prickett, San Diego, Calif.

[73] Assignee: The United States of America as represented by the Secretary of the Navy, Washington, D.C.

[21] Appl. No.: 944,667

[22] Filed: Sep. 22, 1978

[51] Int. Cl.³ .............................................. G01S 13/70
[52] U.S. Cl. .................................................... 343/7.3
[58] Field of Search .......................... 343/7.3, 5 R, 8

[56] References Cited

U.S. PATENT DOCUMENTS

| | | | |
|---|---|---|---|
| 2,991,467 | 7/1961 | Clarke | 343/8 X |
| 3,040,311 | 6/1962 | Segerstrom | 343/8 X |
| 3,141,163 | 7/1964 | Parode et al. | 343/7.3 |
| 3,258,767 | 6/1966 | Jacobsen | 343/5 R |
| 3,258,768 | 6/1966 | Vogler | 343/7.3 |
| 3,260,969 | 7/1966 | Jacobsen | 343/5 R X |
| 3,341,847 | 9/1967 | Fried et al. | 343/8 X |
| 3,778,827 | 12/1973 | Strenglein | 343/7.3 |
| 3,787,848 | 1/1974 | Laundry et al. | 343/7.7 |

*Primary Examiner*—Malcolm F. Hubler
*Attorney, Agent, or Firm*—Richard S. Sciascia; George J. Rubens; Harvey Fendelman

[57] ABSTRACT

Means for enabling a high range resolution radar to maintain precise range information of a high velocity maneuvering aircraft or other target during radar operation. A voltage indicative of target motion is provided as an input to a voltage controlled oscillator that develops a waveform having a frequency that varies from the frequency of a stable reference oscillator by an amount commensurate with that voltage input. The frequency differential of the two oscillators is utilized to cause the tracking window to move in proportion to the range rate of the target.

8 Claims, 3 Drawing Figures

HIGH RANGE RESOLUTION RADAR RATE AIDED RANGE TRACKER

BACKGROUND OF THE INVENTION

Various high range resolution radars have been used in the past. Each such radar has required a range tracker to maintain the target in the data viewing window. Various techniques have been used to track the targets such as motors with mechanical driven phase shifters, and multi-control electronic phase shifters but these techniques have been difficult to use and have proved unsatisfactory with high velocity maneuvering targets. Additionally, the relative system time responses of the range tracker is very critical due to the large radar system bandwidth necessary for high range resolution.

SUMMARY OF THE INVENTION

The present invention relates generally to high range resolution radar devices and systems and more specifically to a rate aided range tracker for such systems. Typically, a radar transmits a signal into space and then receives an echo of that signal when an object comes in contact with it. When a moving object is detected and is being tracked, the time relationship of the echo and the transmitted signal will be constantly changing. To track high velocity maneuvering targets, the range tracker must be designed to be sensitive to changes of target velocity and not just range. Once the moving range window is aligned with the target, the window will effectively move in space along with the target. Only when target accelerations occur does the tracker have to be adjusted. This feature is called rate aided. The target range tracker of the present invention maintains a precise time delay between the stable transmitted trigger pulse and the window trigger pulse. The time jitter and rise time of these two pulses must be very small, on the order of the reciprocal of the system bandwidth. The time jitter and delay time achieved with the rate aided range tracker of the present invention can be made to be much less than one nanosecond.

The invention as disclosed herein can be operated in an electronic automatic mode or it may utilize a human operator as an element of its control system when operated in the manual mode. The electronic automatic mode requires a human to identify and initially acquire the target of interest in a multiple target environment. Both invention modes will be described as illustrated in the accompanying drawings.

OBJECTS OF THE INVENTION

The primary object of the present invention is to disclose a range tracker that is rate aided.

A concomitant object of the present invention is to enable a high range resolution radar to maintain precise range information of the high velocity maneuvering craft within a distance as small as one foot during radar operation.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
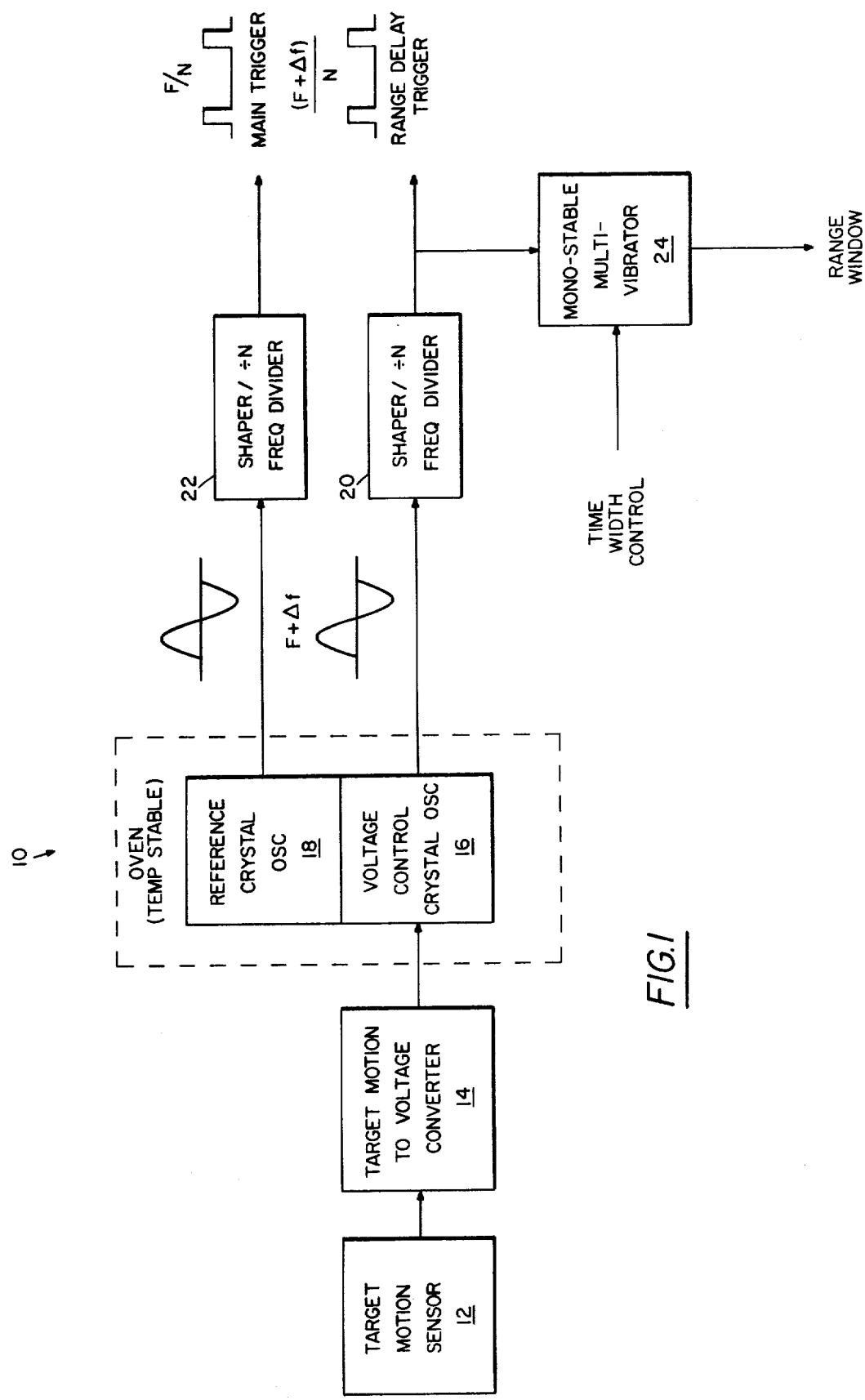
FIG. 1 is a schematic block diagram of the high range resolution radar high speed target rate aided range tracker of the present invention embodied in the automatic mode.

Referring now to FIG. 1 there is illustrated the automatic mode rate aided range tracker 10 of the present invention. In the automatic mode the range tracker 10 as illustrated in FIG. 1 operates such that once a target of interest is acquired by the operator, the range window will stay within time coincidence of the target without human control. The two functional blocks as illustrated in FIG. 1 as the target motion sensor 12 and the target motion to voltage converter 14 are different for the automatic mode relative to what will be described below for the manual mode. All other functions shown in FIG. 1 remain the same. The target motion sensor 12 compares the target echo video signal input with a range trigger signal input and provides an output that is a bipolar signal depending on the relative timing of these two inputs. This principle has been used in the past and is referred to as the "early/late gate" technique. An early/late gate network for use with the present invention preferably will utilize very high speed circuit components to accommodate the fast rise time pulses of the high range resolution radar.

The target motion to voltage converter 14 processes the bipolar signal output of the target motion sensor 12 and produces a stable d.c. voltage to control the voltage controlled crystal oscillator (VCO) 16 over the required frequency range. The target motion to voltage converter 14 may be implemented as a stable, electronic controlled voltage regulator that is matched to the requirements of the VCO being used.

Referring now to the oscillator portion of the invention, it is observed that there are two stable crystal oscillators, 16 and 18, included into one mechanical assembly using the same voltage source and a stable elevated temperature. The reference crystal oscillator 18 and the voltage controlled oscillator 16 have the same nominal frequency output. With a stable precise control voltage, the two output frequencies of 16 and 18 will be the same. The frequency deviation required of the voltage control oscillator is quite small during the tracking operations and is denoted herein $\Delta f$. An exemplary operating frequency for the oscillators 16 and 18 is in the range of 12 MHz for both oscillator outputs. As the control voltage to the input of voltage controlled crystal oscillator 16 is varied about a certain point, the frequency output of the voltage controlled oscillator 16 will deviate about the frequency of the reference oscillator in a consistent repeatable manner without noticeable time delay. The output then of the reference crystal oscillator 18 is a signal of frequency F and the output of the voltage controlled crystal oscillator 16 is a signal of frequency $F \pm \Delta f$ where the frequency deviation $\Delta f$ is determined by the input from the target motion to voltage converter 14.

The outputs of each of the oscillators 16 and 18 are connected to signal shaper and frequency dividers 20 and 22, respectively.

The shaper and frequency dividers 20 and 22 are substantially identical and may be implemented by a Schmitt trigger and a digital frequency count-down circuit such as a series of flip-flops as is well known. The Schmitt trigger is used to transform a positive voltage level from the oscillator to a relative narrow positive pulse with a frequency of the oscillator. The frequency of the pulse train generated by the shaper network is divided by the frequency divider by a factor of N. This has the effect of increasing the time period of the pulse train to match the desired pulse repetition interval (PRI) of the radar. The pulse train output of the shaper and frequency divider network 22 is the source of the radar main trigger.

The output of the signal shaper and frequency divider network 20 is connected as an input to the monostable multivibrator 24. The function of the monostable multivibrator 24 is to provide a range window that has a width that is at least as wide as the radar width of the target. The circuit has a time width control input so that different targets of interest can fit the range window.

The operation of the rate aided range tracker 10 of the present invention thus far described is as follows. Assume for example, that the reference crystal oscillator 18 frequency output F=12 MHz, i.e. the reference oscillator output and that the frequency divider factor N=6,000, then the quantity F/N=2 KHz. This represents a 500 microsecond period for the radar main trigger pulse. The quantity F±Δf, therefore, would be in this example 12 MHz±Δf, i.e., the VCO 16 output. Utilizing the same frequency divider factor N of 6,000 for the frequency divider network 20 it is evident that the quantity $$\frac{F \pm \Delta f}{N} = \frac{12 \text{ MHz} \pm \Delta f}{6,000}$$

yields a range delay trigger that has a period of 500 microseconds ± the quantity ΔT. If a comparison is made between the main trigger at the output of shaper/divider 22 and the range delay trigger at the output of shaper/frequency divider 20, it can be shown that the range delay trigger will "walk" relative to the main trigger by changing the voltage to the VCO 16. By slightly decreasing the output frequency of the VCO 16, the range delay trigger will occur later corresponding to a target that is moving away from the radar. Increasing the frequency of the VCO 16 will have the opposite effect. If the two oscillators 16 and 18 have the precise same frequency, the two pulse trains will be stationary.

If it is assumed that a stationary target that was time coincident with the range window has instantaneously moved, for example, 5 feet further from the radar and then becomes stationary again, in accordance with the present invention, the range window will be put back into time coincidence with the target in the following manner. First, before the target moved, the two oscillators 16 and 18 had the precise same frequency. Second, after the target moved, the VCO 16 frequency must be decreased so that the range delay trigger will occur 5 feet further, or in terms of radar timing, 10 nanoseconds later. Solving this equation for Δf, $$\frac{12 \text{ MHz} \pm \Delta f}{6,000} = \frac{1}{500\mu s + 10 ns} \quad \Delta f = 240 \text{ Hz}$$

Thus, the VCO 16 should decrease its frequency by 240 Hz until the range window has moved out 5 feet and should quickly return to the reference frequency. When the target is moving with constant velocity, the VCO 16 must have a constant frequency deviation from the reference oscillator frequency. Thus, the velocity, time rate of change of range, of the tracked target is directly proportional to the VCO 16 frequency deviation from the reference crystal oscillator 18 frequency. This rate aided feature enables the tracker to function very smoothly without time jitter. If target acceleration or deceleration is sensed, the VCO 16 frequency deviation will change commensurately.

Figure 3:
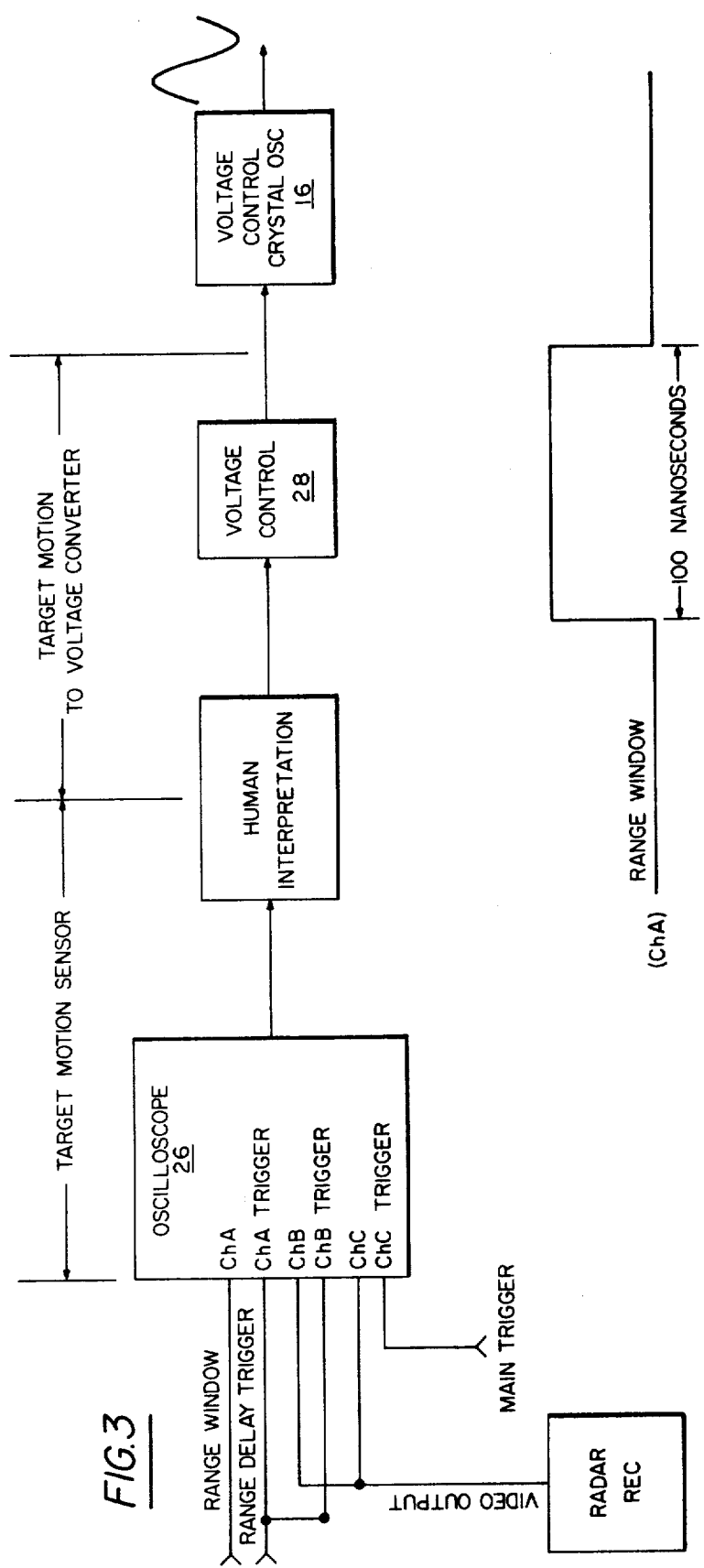
FIG. 3 is a functional block diagram of the range tracker of the present invention as implemented in the manual mode.
Figure 2:
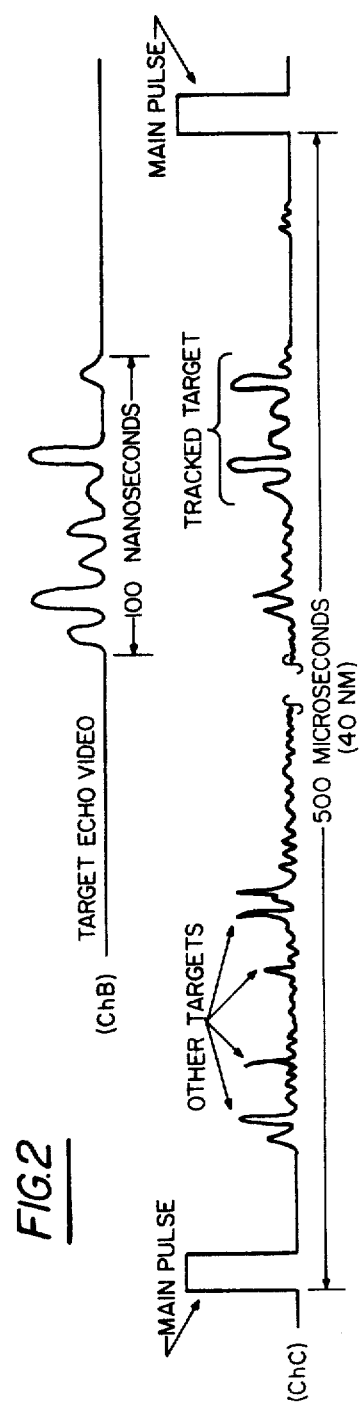
FIG. 2 is a graphical display of target motion relative to the radar tracker.

Referring now to FIG. 3 there is illustrated the rate aided range tracker of the present invention as embodied in the manual mode. Insofar as like components have already been described with reference to FIG. 1, identical reference numbers will be used to describe such like components. In this embodiment, an operator would use a three channel/dual sweep speed oscilloscope or similar instrument to display the time relationship of the radar range window, the target echo, and the full range of the radar. Such an oscilloscope is depicted as block 26 in FIG. 3. The high range resolution radar has the capability of presenting range detail on the order of one foot. Therefore the oscilloscope 26 channels that display range window and target echo video must be a much faster horizontal sweep than the channel that displays the full radar range. FIG. 2 illustrates how this oscilloscope display would be viewed after the target has been acquired and is being tracked. It is to be understood that the values depicted in FIG. 2 are exemplary only. With the accelerations and decelerations of the target, the relative time between the range window and the target echo video will change and the operator will make a slight adjustment on the panel dial of the voltage control network 28 which will increase or decrease the voltage control to the variable oscillator 16. This adjustment will bring the range window and the target echo video back into time coincidence.

Obviously, many other modifications and variations of the present invention are possible in the light of the above teachings. It is therefore to be understood that within the scope of the appended claims the invention may be practiced otherwise than as specifically described.

What is claimed is:

1. A rate aided range tracker having a range delay trigger for a high resolution radar having a main trigger comprising:

first means for sensing target motion and for converting detected target motion to a commensurate voltage output;

a reference oscillator for outputting a reference frequency signal;

a voltage controlled oscillator having its input connected to said first means for outputting a voltage controlled signal;

second means connected to said reference oscillator for outputting a pulse train that is the main trigger signal of said radar and for input to said main trigger of said high range resolution radar;

third means connected to said voltage controlled oscillator for outputting a trigger pulse train variably delayed or advanced from said second means pulse train for input to said range delay trigger; and a monostable multivibrator connected to the output of said third means.

2. The range tracker of claim 1 wherein said first means comprises an early/late gate network.

3. The range tracker of claim 1 wherein said first means further comprises a voltage regulator connected to said early/late gate network.

4. The range tracker of claim 1 wherein said reference oscillator and said voltage control oscillator are enclosed in one temperature oven.

5. The range tracker of claim 1 wherein said target motion is acceleration.

6. The range tracker of claim 1 wherein said second means converts said reference frequency signal to a rectangular pulse train.

7. The range tracker of claim 6 wherein said third means converts said voltage controlled signal to a rectangular pulse train.

8. The range tracker of claim 7 wherein the frequency of said voltage controlled signal deviates from said reference frequency by an amount determined by said voltage output.

* * * * *